Aug. 22, 1933.   P. A. KOEHRING   1,923,151
AUTOMATIC CENTRAL MIXING PLANT
Filed Dec. 9, 1930
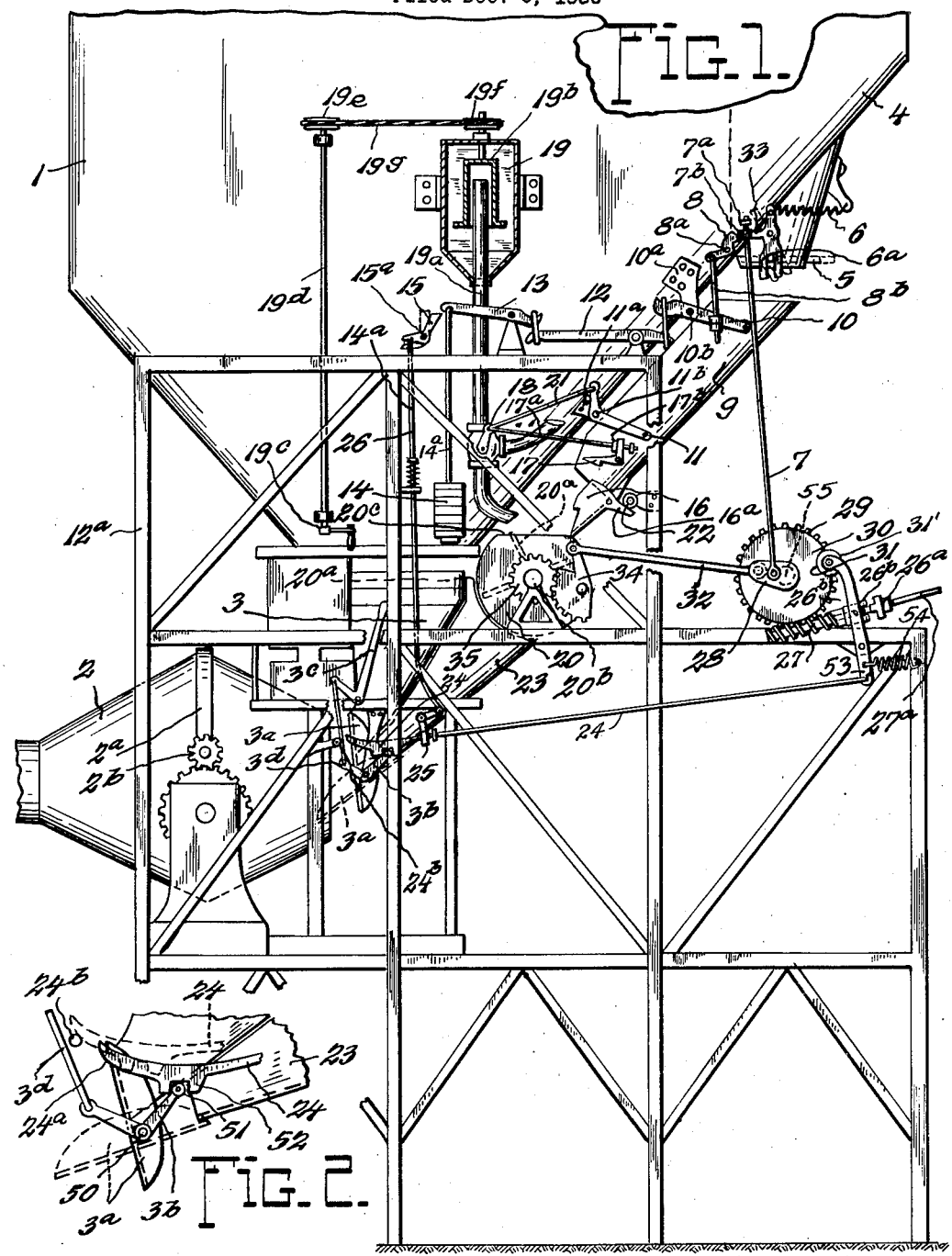
INVENTOR.
PHILIP A. KOEHRING.
By
Attorneys

UNITED STATES PATENT OFFICE 1,923,151

AUTOMATIC CENTRAL MIXING PLANT

Philip A. Koehring, Milwaukee, Wis., assignor to Koehring Company, Milwaukee, Wis., a Corporation Application December 9, 1930. Serial No. 501,117

12 Claims. (Cl. 83—73)

This invention has for its primary principle, the designing of an improved type of central mixing plant of the type which is at present employed on a considerable scale for the admixture of aggregates of concrete. So far as I am aware, it has heretofore been proposed to utilize in central mixing plants of this type suitable weighing or measuring appliances whereby to predetermine the proportions of the materials to be mixed, and supply these materials in a dry condition to a suitable mixer forming a part of the plant, in which mixer the materials are mixed with water and later discharged from the mixer after a required mixing period has elapsed.

The principal object which I have had in view in developing the improvements herein, has been to so design the central mixing plant that the cement and water used in the ultimate mixed batch are preliminarily mixed to form a slurry, which slurry is introduced into the concrete mixer, usually of the drum type, along with the heavier aggregates, such as sand and gravel. To those versed in the art there are many advantages for the premixing of cement and water and subsequent admixture thereof with the heavy aggregates, such action reducing the work of the motor driving the mixer, enabling the agitating instrumentalities in the mixer to more readily perform their function, maintaining the inside parts of the mixer cleaner, and generally increasing the efficiency of the machine.

In addition to the instrumentalities used by me for enabling the premixing which performs the slurry, of cement and water, there are special control instrumentalities used for the weighing of the cement and for the automatic operation of the general apparatus to cause the cement and water to enter a premixer, discharge therefrom, and pass into the final main mixer at the time the heavier aggregates are supplied to the latter.

The annexed drawing illustrates a type of machine embodying the principles of this invention, it being understood that this specifically illustrative type of machine hereinafter to be described in detail, is to be regarded as being descriptive only, and not as limiting the invention to this specific construction.

In the drawing,

Figure 1 represents more or less diagrammatically, an elevation of a central mixing plant for concrete and the like built in accordance with this invention.

Figure 2 is a fragmentary view of a portion of this construction illustrating certain details thereof, and Figure 3 represents another fragmentary view of a yet different portion of the construction in the nature of a plan view of this portion.

Referring more particularly to the drawing, it will be seen that there is provided a batcher unit 1 which may be of any well known types of batcher units on the market, such as, for example, the Blaw-Knox, the Johnson, or the Butler type, each of which types has a well known status in the art.

This batcher unit 1 is adapted to discharge into a principal mixing drum 2, which is rotatable, as indicated at 2a and tiltable along its longitudinal axis for the discharge of mixed materials, through the gear and pinion system 2b. The discharge from the batcher 1 to the drum 2 is conveniently effected through the intermediary of a hopper 3, which is adapted to weigh controlled quantities of coarse sand and gravel aggregate issuing from the batcher 1, and to discharge the weighed aggregate into the drum 2.

It will be also seen that arranged beside the batcher unit 1 is a cement hopper 4, provided with a closing member 5, normally resiliently held closed by suitable means, as by spring 6.

Pivoted to the hopper 4 is a lever member 6a, through one arm of which is passed a rod 7, to be more definitely described hereinafter, carrying an abutment member 7a, as for example, a nut threaded upon the end of the rod 7, this member 7a being adapted to pass through and abut against an eye 7b formed in one arm of the lever 6a.

Pivotally associated with this arm of the lever 6a is a latching member 8 pivotally mounted as at 8a, and forming a bell crank, one arm of which is in engagement with the aforesaid arm of the crank 6a, the other arm of the bell crank 8 having a rod 8b pivotally secured thereto.

Beneath the closure member 5 of the hopper 4 is positioned a weighing hopper 9 adapted to receive predetermined amounts of cement from the hopper 4, the hopper 9 being supported for movement relatively vertically by pivoted levers 10 and 11, these levers being secured to the batcher unit 1 by brackets 10a and 11a respectively, the levers 10 and 11 being fulcrumed at 10b and 11b, respectively.

It will be apparent that the batcher unit 1 and its assembly of cooperating mechanism, are supported by a framework indicated generally at 12a, this frame-work carrying a train of levers 12 and 13, lever 12 being in operative engagement with the aforesaid lever 10, and lever 13 coacting with lever 12 to produce, in effect, scale beams of a weighing device by means of which the quantity of cement discharged into the hopper 9 from the hopper 4 can be weighed before it is mixed; and this weighing operation may be carried out by means of counterbalancing weights 14 suspended from a rod 14a, which in turn hangs from one arm of the lever 13. Since it is apparent that the weights 14 are for the purpose of measuring a predetermined amount of cement passing from the hopper 4 into the hopper 9, the hopper 9 will be maintained in raised position through the action of the weights 14 and the lever system 10, 11, 12, and 13, until a sufficient amount of cement has been passed into the hopper 9 to counteract the weights 14. In order to hold the hopper 9 in its lower position after it has received its charge of cement sufficient to overcome the pull of the weights 14, there is provided a latching member 15 adapted to engage the lever 13 through one of its arms, the latching member 15 being pivoted at 15a.

The hopper 9 is provided with a gate or door 16, releasably secured in position by the pivoted latching member 17 and being normally held in closed position by virtue of having an offset portion, or equivalent provision, engaging the said latching member 17. This latching member is connected by means of a rod, or similar member 17a, carrying abutment member 17b to a handle 18 of a three-way valve positioned in the discharge pipe 19a of a water measuring tank 19.

It will be apparent that the operation of the handle 18 will cause water to flow into the tank 19 from a filling tank, not shown, or it may discharge a premixed quantity of water from the tank 19 into a premixer 20 positioned beneath the gate 16 of the cement hopper 9. This premixer 20 is conveniently of a paddle type, carrying rotating paddles 20a which will serve to mix the charge of cement coming from the hopper 9 with the required amount of water being discharged from the tank 19; and it will be apparent that the volume of water delivered from the tank 19 is determinable by adjusting the position of the inner cup member 19b through manipulation of a handle 19c, rod 19d secured thereto, and pulleys 19e—19f over which passes a cable 19g. The operation of the movement of the valve lever 18 is accomplished by means of the connecting rod 21 pivotally secured to the lever 11 and the valve lever 18.

The premixer 20 is open at the top, as indicated at 20c, and is mounted for rotation upon trunnions 20b, so that it may be rotated sufficiently to discharge the contents thereof out through the opening 20c and into the hopper or trough 23 placed beneath this premixer 20. This hopper 23 may be positioned directly behind the hopper 3 for the coarse aggregates, although it will be apparent that the essential detail of its arrangement is that it be positioned so as to discharge into the main concrete mixer 2.

It will be further noted that adjacent to the discharge hopper 3 for the coarse aggregates, there is positioned an operating lever 3c, which is in operative engagement with an actuating lever 3d, which is connected with a bell crank 3b, for the actuation of the chute 3a which is provided for guiding both the coarse aggregates and the cement slurry from their respective hoppers into the mixing drum 2. Both the chute 3a and the bell crank 3b are fixed to a shaft 50, which shaft turns when a pull is exerted upon the bell crank 3b.

One arm of the bell crank may be provided with an anti-friction roller 51, which engages and fits into a cut-away portion in the member 52, which member 52 forms the terminus of the rod 24. The end of the member 52 is cam-shaped, as indicated at 24a, whereby upon contact with a stop 24b, the member 52 will be lifted out of engagement from the bell crank 3b. This action will therefore permit the withdrawal of the bell crank 3b and the turning of the chute 3a to inoperative position.

The rod 24 has connected to it a bell crank 25, the other end of which bell crank is connected through rod 26 to the latching member 15; the rod 24 terminating in a lever 53, and being under the influence of a spring 54 mounted upon the supporting frame 12a. Carried by the lever 53 is a clutch member, one part 26a of which is carried on the shaft 27a, the other portion of the clutch member being secured to the lever 53 and carrying a worm 27 so that when the parts of the clutch 26a and 26b are brought into engagement, rotation of the shaft 27a, which is constantly driven, will cause a rotation of the worm 27.

In operative engagement, worm 27 is in engagement with the worm gear 29, rotating about shaft 55, there being also mounted on the shaft 55 a disc 30 having a camming notch 31 therein into which the roller 31' of the clutch lever 53 is adapted to engage as the disc 30 rotates. The disc 30 also carries the lever member 28, to which the premixing drum 20 is connected by means of the rod 32, and also to which the closure member 5 of the hopper 4 is connected through means of the rod 7.

Rod 32 terminates in a rack segment 34, which engages with the gear 35 on the premixing drum 20 to cause the drum to be tilted to discharge its concrete slurry into the hopper 23. The camming notch 31 in the disc 30 causes the clutch 26a and 26b to remain engaged until the crank 28 has made one complete revolution, at which time the clutch will be again disengaged.

Reviewing, then, the operation of this mechanism, it will be seen that proper proportions of heavy aggregates are placed into the batcher unit 1 and the bin 4 is filled with cement.

The heavy aggregates pass from the batcher unit 1 into the hopper 3 from which they may be discharged at the proper time into the mixing drum 2. The discharge opening of the hopper 3 is closed by means of the discharge chute 3a when the same is in non-discharging position. The cement is held in the bin 4 until it is desired to be used through the provision of the closure or gate 5 normally held closed by the spring 6, although when the gate 5 has been opened by a downward pull on the rod 7 the gate will be held open by the latch 8 for discharge of its contents into the weighing hopper 9, which is, as previously pointed out, supported for vertical movement by the pivoted levers 10 and 11. The lever 10 is suitably connected, as illustrated, to the scale beams 12, 13, which latter beam is connected to the cement counterbalancing weights 14.

A latch 15 is provided for holding the beam 13 in its balancing position so that the cement weighing hopper 9 will be held in its lower position once it has received enough cement to overbalance the weights 14.

The hopper 9 is provided with the gate 16, which is adapted to be released from the latch 17 by movement of the snapover valve operating handle 18, as the valve is moved from tank filling to tank emptying position, thereby permitting the mixing water from a water measuring tank 19 to be discharged into the cement mixer 20 at the same time that the contents of the hopper 9 are dumped into the cement mixer 20, which mixer 20 constitutes, therefore, a premixer in which a cement-water slurry is produced. The operation of the movement of the valve lever 18 is accomplished by the connection 21 between the lever 11 and the valve lever 18.

When the latch 15 releases the weighing mechanism of the hopper 9 this action returns the now empty, lighter cement weighing hopper 9 to its original position, and the upward movement thereof rocks the lever 11, actuating the connection 21 to return the valve to measuring tank filling position, latch 17 being released and the roller 22 striking an extension 16a on the gate 16, causing the gate to be closed and locked by a now released latch 17.

As before mentioned, the mixer 20 is preferably of the paddle type having the opening 20c at the top to receive cement and water from the hopper 9 and the tank 19; and the mixer 20 is rotatable on its trunnions 20b sufficiently to discharge its contents out through the opening 20c into the hopper or trough 23.

This trough 23 discharges into the main drum 2 and it is brought into operative engagement with the chute 3a in the manner previously described.

Therefore, it will be seen that in fact the operation of this device is set up through actuation of the lever 3c transmitting its motion through the lever 3d, the bell crank 3b to the rod 24, this actuation not only producing movement of the rod 24 but also bringing the chute 3a into position whereby the contents of both hoppers, 3 and 23, are discharged by means of the chute 3a into the mixing drum 2.

It will also be seen that the actuation of the rod 24 accomplishes two separate functions.— First, actuation of the rod 24 rocks the bell crank 25, causing the rod 26 to be pulled downwardly, thereby moving the latch 15 to disengage the weighing mechanism for the cement, permitting the hopper 9 to return to what may be called the filling position; that is, permits the hopper 9 to move upwardly to receive a new charge from the cement bin 4. Second, the movement of the rod 24 throws in the clutch members 26a and 26b causing the worm 27 to drive the crank 28 through the worm wheel 29. The disc 30 also provided on the shaft carrying this worm wheel and rotating therewith, as previously mentioned, has a camming notch 31 therein which causes the clutch to remain engaged until the crank 28 has made one complete revolution, at which time the clutch will be again disengaged; and it may be here pointed out that the shaft 27a is constantly rotating.

The crank 28 has two connections, one to the mechanism for tilting the premixer 20, this connection being designated as 32, and the other to the lever 33, through rod 7, for opening the door or gate 5 of the bin 4 containing the bulk cement. Movement of the rod or connection 32 to the right by the crank 28 will actuate the rack segment 34 which meshes with the gear 35 on the premixer 20, causing this premixer to be tilted to discharge into the hopper 23.

As will be accordingly seen, as the hopper 9 receives its predetermined quantity of cement, as determined by the weights 14, the hopper 9 will move downwardly. This action causes the lever 10 to release the latch 8 which allows the spring 6 to snap the gate 5 controlling the cement discharge from the bin 4 over to closed position.

The water tank 19 which has been previously filled, is now ready for discharge as well as the now filled cement weighing hopper 9, and the downward movement of the hopper 9 will cause the lever 11 to snap the valve lever 18 to discharging position. This action causes the latch 17 to release the gate 16, permitting the contents of the weighing hopper 9 as well as measuring tank 19 to be discharged into the mixer 20.

Due to the latch 15, the parts remain in this position until the hopper 3 of the batcher unit 1 is discharged into the mixing drum 2, and this action causes the contents of the mixer 20, as well as the sand and gravel aggregate from the hopper 3, to be dumped into the main mixer 2 over the chute 3a.

At the same time the cement hopper 9 is permitted to return to its upper receiving position, and the gate 5 is opened by power exerted through the rod 7 and latched over. This return of the hopper 9 to its upper position simultaneously causes the valve lever 18 to be turned to position to permit filling the tank 19.

As the tank 19 and hopper 9 are filling, the slurry mixer 20 is emptying and being returned, ready to receive the next batch of cement and water. It will be apparent that the mixing cycle is started by the manual actuation of the lever 3c with corresponding actuation of the chute 3a and rod 24 to cause the engagement of the clutch members 26a and 26b and release of the latch member 15.

From the above description, it will be apparent that there is provided an efficient mixer adapted for use as an automatic central mixing plant, which is easily constructed, assembled, and operated; and while the specific construction herein illustrated and described is a convenient and desirable form which the invention may take, it is apparent that many changes may be made therein without departing from the inventive concept. Accordingly, it will be understood that it is intended and desired to embrace within the scope of this invention such modifications and changes as may be necessary to adapt it to varying conditions and uses.

Having thus described my invention, what I claim as new and desire to secure by Letters Patent of the United States, is—

1. In an apparatus of the class described, the combination with a supporting framework having a coarse aggregate batcher unit and a bulk cement bin carried by the frame, of means for discharging controlled quantities of cement from the bin, weighing mechanism for weighing the controlled quantities of the cement as discharged from the bulk bin into the weighing mechanism, means synchronized with the weighing mechanism for automatically closing the bin discharge when the desired weighed amount of cement is discharged therefrom, a premixer for receiving the weighed cement from the weighing mechanism, instrumentalities actuated by the weighing mechanism for introducing into the premixer with the cement predetermined measured quantities of water to form a cement slurry in the premixer, a hopper for weighing controlled amounts of coarse aggregates from the batcher, a main mixing drum means for introducing the said weighed amounts of coarse aggregates and cement slurry simultaneously into the main mixing drum, timing mechanism for automatically synchronizing the operating cycle of the aforesaid means and instrumentalities, and manually operable means for controlling the discharge of aggregates and slurry into the main mixing drum while placing the timing mechanism into operation.

2. In apparatus of the class described, comprising the combination with a supporting framework having a coarse aggregate batcher unit a bulk cement bin and cement premixing means supported by the framework, of means for delivering predetermined quantities of cement from the bin to the premixer, means actuated by the cement delivery for introducing simultaneously with the cement a predetermined quantity of water into the premixer to form a cement slurry, actuating instrumentalities for the aforesaid means, a main mixing drum, and mechanism operable by the said actuating instrumentalities for introducing predetermined quantities of coarse aggregates substantially simultaneously with the slurry into the main mixing drum.

3. In apparatus of the class described, comprising the combination with a supporting framework having a coarse aggregate batcher unit a bulk cement bin and a premixing drum supported by the framework, of weighing mechanism for automatically delivering predetermined amounts of cement from the bin to the premixing drum, means actuated by the weighing mechanism for introducing measured quantities of water into the premixing drum to form a slurry therein, a main mixing drum, timing mechanism for controlling the operation of the said weighing mechanism and for dumping the premixing drum, and instrumentalities for setting the timing mechanism into operation and for introducing predetermined quantities of coarse aggregates from the batcher substantially simultaneously with the slurry into the main mixing drum.

4. In apparatus of the class described, the combination with a supporting framework having a coarse aggregate batcher unit and a bulk cement bin supported by the framework, of weighing mechanism for receiving cement from the bin and comprising a hopper movably responsive to a predetermined weight of the cement so received, a premixing drum, a gate for the said bin permitting discharge of cement from the bin into the said hopper, means for discharging the weighed cement from the hopper into the premixing drum and for simultaneously introducing therein a measured quantity of water from a supply thereof to form a slurry in the said drum, the weighing hopper closing and returning to its charging position when emptied, while shutting off the water, a main mixing drum, timing mechanism for charging the weighing hopper and for dumping the slurry into the main mixing drum, and instrumentalities for operating the timing mechanism and for discharging into the main mixing drum a predetermined quantity of coarse aggregate from the batcher unit substantially simultaneously with the slurry.

5. In apparatus of the class described, the combination with a supporting framework having a coarse aggregate batcher unit and a bulk cement bin supported by the framework, of weighing mechanism for receiving cement from the bin and comprising a hopper movably responsive to a predetermined weight of cement so received, a premixing drum, a main mixer, a water supply, means for discharging the cement from the weighing hopper to the premixing drum, means associated with said weighing hopper and said water supply and responsive to the movement of the weighing hopper for discharging measured amounts of water into the premixing drum for forming a cement slurry therein, a hopper for receiving and determining amounts of coarse aggregates from the batcher unit, means for dumping the slurry from the premixing drum into the main mixer and associated control instrumentalities therefore under control of an operator for simultaneously discharging the coarse aggregates and slurry into the said main mixer, for actuating the weighing mechanism, for discharging the cement from the bulk bin into the weighing hopper and for actuating the slurry dumping means.

6. In a mixing plant for delivering ready-mixed concrete for distribution, the combination with a supporting framework having a coarse aggregate batcher unit and a bulk cement bin carried by the frame, of means for preparing a cement slurry, a mixing drum means comprising a hopper for receiving a predetermined amount of coarse aggregates, from the batcher unit and manually initiated power-operated instrumentalities associated therewith for delivering the said coarse aggregates and slurry substantially simultaneously to the mixing drum which is adapted to mix the slurry and aggregates and to deliver the resulting mixed concrete therefrom in condition suitable for distribution.

7. In a mixing plant for delivering ready-mixed concrete for distribution, the combination with a supporting framework having a coarse aggregate batcher unit and a bulk cement bin also carried by the frame, of means for preparing a cement slurry of predetermined weight, a mixing drum, means comprising a hopper for delivering a predetermined quantity of coarse aggregate, and instrumentalities comprising automatic tripping devices associated with the slurry preparing means and said coarse aggregate delivering hopper for substantially simultaneously admitting the slurry and aggregate to the mixing drum which is adapted to mix the slurry and aggregate and to deliver the resulting mixed concrete therefrom in condition suitable for distribution.

8. In a mixing plant for delivering ready-mixed concrete for distribution, comprising the combination with a supporting framework having a coarse aggregate batcher unit and a bulk cement bin carried by the frame, and associated premixing and mixing drums, of automatic weighing mechanism for delivering a predetermined quantity of cement from the bin to the premixing drum, water supply means, means for tripping the weighing mechanism aforesaid to discharge the cement into the drum together with predetermined quantities of water from the water supply means to form a slurry, a hopper for delivering predetermined quantities of coarse aggregates to the main mixing drum, and associated tripping mechanism arranged to discharge the slurry and aggregates substantially simultaneously into the mixing drum.

9. A concrete mixing plant of the class described, comprising the combination with a coarse aggregate batcher unit and a bulk cement bin, of weighing mechanism for receiving cement from the bin, a premixer for receiving weighed quantities of cement from the weighing mechanism, a water supply adapted to discharge into the premixer a measured quantity of water for forming a cement slurry therein, tripping devices arranged to operate the said weighing mechanism, water supply and premixer, a hopper for receiving and determining quantities of coarse aggregates from the batcher unit a main mixing drum, means for discharging the said determined quantities of coarse aggregates and the cement slurry substantially simultaneously into the main mixing drum adapted to deliver ready mixed concrete therefrom, actuating mechanism for the said tripping devices, and an operating member for placing the said actuating mechanism into operation.

10. A concrete mixing plant of the class described, comprising the combination with a coarse aggregate batcher unit and a bulk cement bin, of weighing mechanism for receiving cement from the bin, the said weighing mechanism comprising a movable hopper provided with a discharge gate, and weighted lever arms adapted to balance a charge of cement introduced into the hopper, tripping mechanism for releasing the said weighted arms, the hopper gate being opened and closed through movement of the hopper responsive to charging and discharging of the hopper, a premixing drum for receiving the weighed cement from the hopper, means for supplying water in measured quantities to the mixing drum to form a slurry with the cement therein, valve mechanism actuated by the movement of the weighing hopper for controlling discharge of the said measured quantities of water into the premixing drum, actuating means for discharging the said slurry from the premixing drum at predetermined time intervals and for simultaneously recharging the weighing hopper from the cement bin, a main mixing drum, a second hopper for receiving predetermined amounts of coarse aggregates from the batcher unit, instrumentalities for discharging the coarse aggregates into the main mixing drum substantially simultaneously with the introduction of the cement slurry therein, and means for releasing the tripping mechanism for the said weighted arms and for operating the said actuating means.

11. A concrete mixing plant of the class described, comprising the combination with a coarse aggregate batcher unit and a bulk cement bin, of weighing mechanism for receiving cement from the bin, the said mechanism comprising a movable hopper provided with a discharge gate and releasable weighted lever arms adapted to balance a charge of cement introduced into the hopper, tripping mechanism for releasing the said weighted arms, the hopper gate being opened and closed through movement of the hopper responsive to charging and discharging of the hopper, a premixing drum for receiving the weighed cement from the hopper, means for supplying water in measured quantities to the mixing drum to form a slurry with the cement therein, driving means for actuating the discharging of the said slurry from the mixing drum at predetermined time intervals, the driving means comprising a driving shaft, a driven shaft, a cammed disc rotating on the driven shaft, crank instrumentalities carried by the disc and operatively connected with the cement bin and premixing drum, whereby rotation of the disc produces actuation of the premixing drum and discharge of the cement from the bin into the weighing hopper, with consequent actuation of the weighing hopper and water supply means, a main mixing drum, and means controlled by the operator of the machine for substantially simultaneously discharging the slurry and coarse aggregates into the main mixing drum to form ready mixed concrete therein for delivery therefrom to a desired location, the said means also placing the weighing hopper in weighing position and bringing the driving shaft into operative engagement with a source of power.

12. A central mixing plant as described, comprising a batcher unit for heavier aggregates, a weighing hopper arranged to be supplied with heavier aggregates from said unit, a main mixer arranged to receive said supply, a source of supply of cement, a water supply, valve control means for the water supply, a cement weighing receptacle to receive cement from the cement supply, a premixer disposed to receive water from the water supply and cement from the cement weighing receptacle, an operating mechanism associated with said cement and water supply for causing automatic discharge of the cement weighing receptacle into the premixer along with water from the water supply, means for automatically discharging of the cement slurry mixed in the premixer, and for automatically discharging of the weighing receptacle of the batcher unit to cause the heavier aggregates to enter the main mixer, including a receptacle for receiving the slurry from the premixer and passing the same to the main mixer along with the heavier aggregates.

PHILIP A. KOEHRING.